(12) United States Patent
Filzen et al.

(10) Patent No.: US 9,698,650 B2
(45) Date of Patent: Jul. 4, 2017

(54) ELECTRIC DEVICE, GEARBOX AND ASSOCIATED METHOD

(71) Applicant: Regal Beloit America, Inc., Beloit, WI (US)

(72) Inventors: Scott Ernest Filzen, Janesville, WI (US); Samuel Domonic Finocchio, Loves Park, IL (US); Nicholas Chase Bower, Janesville, WI (US)

(73) Assignee: Regal Beloit America, Inc., Beloit, WI (US)

( * ) Notice: Subject to any disclaimer, the term of this patent is extended or adjusted under 35 U.S.C. 154(b) by 0 days.

(21) Appl. No.: 14/293,040

(22) Filed: Jun. 2, 2014

(65) Prior Publication Data

US 2015/0349606 A1  Dec. 3, 2015

(51) Int. Cl.
*H02K 7/00* (2006.01)
*H02K 7/116* (2006.01)

(52) U.S. Cl.
CPC ......... *H02K 7/116* (2013.01); *Y10T 29/49011* (2015.01); *Y10T 74/19647* (2015.01)

(58) Field of Classification Search
CPC ........... Y10T 403/642; Y10T 403/7062; Y10T 403/7005; Y10T 403/7007; Y10T 29/49009; Y10T 29/49899; Y10T 29/49902; Y10T 74/19684; H02K 5/00; H02K 7/116; F16D 1/108; F16H 1/06; F05B 2260/303
USPC ............ 403/336, 373, 348, 349; 248/222.52, 248/637, 221.12; 417/360, 423.15; 464/81; 74/421 A
See application file for complete search history.

(56) References Cited

U.S. PATENT DOCUMENTS

| | | | |
|---|---|---|---|
| 2,763,802 A | | 9/1956 | Dolon |
| 2,803,474 A | * | 8/1957 | Wilson ..................... F16D 1/108 180/9.48 |
| 3,104,901 A | * | 9/1963 | Potter ....................... H02K 5/00 248/637 |
| 3,395,594 A | * | 8/1968 | Balair ................... F16H 57/025 310/91 |
| 3,724,237 A | * | 4/1973 | Wood .................... B23B 45/003 173/29 |
| 3,813,956 A | * | 6/1974 | Whitecar ................ F16H 7/023 474/144 |
| 4,081,704 A | | 3/1978 | Vassos et al. |
| 4,372,517 A | * | 2/1983 | Welch .................. F02F 7/0068 248/221.12 |
| 4,434,015 A | | 2/1984 | Dyson |

(Continued)

FOREIGN PATENT DOCUMENTS

| | | |
|---|---|---|
| AU | 2013221938 A1 | 6/2014 |
| CN | 2915330 Y | 6/2007 |

(Continued)

*Primary Examiner* — David M Fenstermacher
(74) *Attorney, Agent, or Firm* — John Wagley

(57) ABSTRACT

An electric device is provided. The device includes an electric machine having a rotatable first shaft extending from an end of the machine. The device also includes a gearbox operably connected to the electric machine. The gearbox includes a first gear rotatably supported in the gearbox and a first gear connectable to the first shaft. The first gear is adapted to mesh with the second gear. The electric machine and the gearbox are adapted to drive a pump.

16 Claims, 13 Drawing Sheets

(56) References Cited

U.S. PATENT DOCUMENTS

| | | | |
|---|---|---|---|
| 4,643,063 A | 2/1987 | Gobien | |
| 4,757,786 A * | 7/1988 | Ellegard | B27B 17/10 123/198 DC |
| 4,766,777 A * | 8/1988 | Hartz | B60K 5/10 29/456 |
| 5,771,516 A * | 6/1998 | Huang | B25F 3/00 254/122 |
| 6,094,797 A * | 8/2000 | Sherman | F02N 11/04 248/222.52 |
| 6,123,518 A * | 9/2000 | Zakula, Sr. | F16D 1/06 417/364 |
| 6,253,640 B1 * | 7/2001 | Phillips | F16H 57/029 74/606 R |
| 6,358,224 B1 * | 3/2002 | Tims | A61M 1/0062 604/246 |
| 6,462,442 B1 * | 10/2002 | Braun | G01D 5/34738 250/231.13 |
| 6,478,560 B1 * | 11/2002 | Bowman | F04C 23/001 418/1 |
| 6,577,034 B1 * | 6/2003 | Kitamura | H02K 7/116 310/66 |
| 7,074,017 B2 * | 7/2006 | Coray | F04D 13/021 29/888.021 |
| 7,143,664 B2 * | 12/2006 | Schunke | H02K 7/102 74/625 |
| 7,152,711 B2 * | 12/2006 | Finocchio | F01M 9/108 184/6.12 |
| 7,191,678 B2 * | 3/2007 | Schunke | H02K 7/116 74/413 |
| 7,452,298 B2 * | 11/2008 | Leichter | H02K 5/18 475/149 |
| 7,839,037 B2 * | 11/2010 | Oberle | H02K 7/1166 310/154.08 |
| 7,911,093 B2 * | 3/2011 | Schueren | H02K 5/225 310/68 R |
| 8,221,094 B2 * | 7/2012 | Nishimura | F01C 21/007 417/243 |
| 8,485,058 B2 * | 7/2013 | Kovacic | A47J 43/08 366/254 |
| 8,746,986 B2 * | 6/2014 | Finocchio | F01M 9/108 184/6.12 |
| 8,757,918 B2 * | 6/2014 | Ramnarain | F04B 17/03 248/678 |
| 2005/0095931 A1 | 5/2005 | Takada et al. | |
| 2009/0314132 A1 * | 12/2009 | Campbell | F16H 57/025 74/606 R |
| 2011/0272172 A1 * | 11/2011 | Lau | B25F 3/00 173/170 |

FOREIGN PATENT DOCUMENTS

| | | |
|---|---|---|
| CN | 201135031 Y | 10/2008 |
| CN | 201151341 Y | 11/2008 |
| CN | 100578056 C | 1/2010 |
| CN | 101608692 B | 1/2011 |
| CN | 202293179 U | 7/2012 |
| CN | 102868253 A | 1/2013 |
| CN | 202674190 U | 1/2013 |
| CN | 203396662 U | 1/2014 |
| DE | 102012207798 A1 | 11/2013 |
| EP | 2609323 B1 | 1/2014 |
| GB | 936849 A | 9/1963 |
| JP | 7236965 A | 9/1995 |
| KR | 2012064251 A | 6/2012 |
| SU | 1661092 A1 | 7/1991 |

* cited by examiner

ELECTRIC DEVICE, GEARBOX AND ASSOCIATED METHOD

BACKGROUND OF THE INVENTION

The embodiments described herein relate generally to an electric machine attached to a gearbox, and more specifically, to an electric machine attached to a gearbox which is mounted to an output shaft of the electric motor.

An electric device is typically a power source in operable connection to a power transferring device. The power source is typically an electric machine and the power transferring device is typically a gearbox.

An electric machine is typically in the form of an electric generator or an electric motor. The machine typically has a centrally located shaft that rotates relative to the machine. Electrical energy applied to coils within the machine initiates this relative motion which transfers the power to the shaft and, alternatively, mechanical energy from the relative motion of the generator excites electrical energy into the coils. For expediency, the machine will be described hereinafter as a motor. It should be appreciated that a machine may operate as a generator and vice versa.

A stationary assembly, also referred to as a stator, includes a stator core and coils or windings positioned around portions of the stator core. It is these coils to which energy is applied to initiate this relative motion which transfers the power to the shaft. These coils are formed by winding wire, typically copper, aluminum or a combination thereof, about a central core to form the winding or coil. An electric current is directed through the coils which induces a magnetic field. It is the magnetic field that initiates this relative motion which transfers the power to the shaft.

A gearbox is a device including a plurality of power transferring components, typically gears, contained within a case or housing. The plurality of gears serve to either transfer the rotary motion generated by the electric machine to another axis, spaced from the axis of rotation of the electric machine or to change the rotational speed of the device from that generated by the electric machine.

These electric devices, particularly those that transmit large power or torque, are bulky and difficult to attach to and remove from the electric machine.

Further some of the devices that transmit large power or torque are located in remote locations where space for placing and accessing the device is very limited and where servicing of the device is very expensive.

The present invention is directed to alleviate at least some of these problems with the prior art.

BRIEF DESCRIPTION OF THE INVENTION

According to an embodiment of the present invention, an electric device is provided. The device includes an electric machine having a rotatable first shaft extending from an end of the machine. The device also includes a gearbox operably connected to the electric machine. The gearbox includes a first gear rotatably supported in the gearbox and a first gear connectable to the first shaft. The first gear is adapted to mesh with the second gear. The electric machine and the gearbox adapted to drive a pump.

According to an aspect of the present invention, the electric device may be provided such that the gearbox includes a gearbox housing and such that the second gear is supported by at least one bearing mounted in the gearbox housing.

According to another aspect of the present invention, the electric device may further include an adapter for connecting the electric machine to the gearbox.

According to another aspect of the present invention, the adapter may be configured to permit engagement of the machine with the gearbox in a direction parallel with the axis of rotation of the second shaft.

According to another aspect of the present invention, the gearbox may include a gearbox housing. The gearbox housing defines an interior and an exterior of the gearbox housing. The gearbox housing further defines an opening of the gearbox housing. The opening permits the passage of the first gear from the exterior of the housing to the interior of the housing, while the first gear is connected to the first shaft.

According to yet another aspect of the present invention, the electric device may be provided such that the first shaft defines a central longitudinal opening therein and the electric device may further include a cover or end cap, engagable with the opening, for securing the first gear onto the first shaft.

According to yet another aspect of the present invention, the electric device may be provided such that the first shaft is only rotatably supported by the machine.

According to yet another aspect of the present invention, the electric device may further include a collar rigidly supported on the first shaft and a seal in sealing engagement with the collar.

According to yet another aspect of the present invention, the electric device may be provided such that the gearbox is bayonet mounted to the machine.

According to another embodiment of the present invention, an electric device is provided. The electric device includes an electric machine. The electric machine includes a rotatable first shaft including a cantilevered portion of the first shaft extending from an end of the first shaft. The electric machine also includes a gearbox operably connected to the electric machine. The gearbox has a first gear rotatably supported in the gearbox and a second gear connected to the cantilevered portion of the first shaft. The second gear is adapted to mesh with the first gear.

According to an aspect of the present invention, the gearbox may include a gearbox housing and the second gear may be supported by at least one bearing mounted in the gearbox housing.

According to yet another aspect of the present invention, the electric device may further include an adapter for connecting the electric machine to the gearbox.

According to yet another aspect of the present invention, the adapter may be configured to permit engagement of the machine with the gearbox in a direction parallel with the axis of rotation of the first shaft.

According to yet another aspect of the present invention, the gearbox may include a gearbox housing that defines an interior and an exterior of the housing. The gearbox housing may define an opening of the gearbox housing. The opening may permit the passage of the second gear from the exterior of the housing to the interior of the housing while the second gear is connected to the first shaft.

According to yet another aspect of the present invention, the electric device may be provided such that the first shaft defines a central longitudinal opening in the shaft and the device may further include a cover or end cap engagable with the opening for securing the first gear onto the first shaft.

According to yet another aspect of the present invention, the electric device may further include a collar rigidly supported on the first shaft and a seal in sealing engagement with the collar.

According to yet another aspect of the present invention, the electric device may be provided such that the second gear includes an internal spline and such that the first shaft includes an external spline.

According to yet another aspect of the present invention, the electric device may be provided such that the gearbox includes a first gearbox housing portion and a second gearbox housing portion connected to the first gearbox housing portion. The first gearbox housing portion and the second gearbox housing portion may be connected to each other along a plane normal to the longitudinal axis of the first shaft.

According to another embodiment of the present invention a method for making an electric device is provided. The method includes the step of providing an electric machine. The electric machine includes a rotatable first shaft including a cantilevered portion thereof extending from an end of the first shaft. The method also includes the steps of providing a first gear, attaching the first gear to the shaft and providing a gearbox having a housing. The method also includes the step of connecting the gearbox to the electric machine.

According to another aspect of the present invention, the method may be provided such that the step of connecting the gearbox to the electric machine includes advancing the motor toward the gearbox housing in a direction parallel to the longitudinal axis of the first shaft.

DETAILED DESCRIPTION OF THE INVENTION

Electric devices that transmit large amounts of torque and power are bulky. They have a large footprint and thus require a large amount of floorspace. They also are difficult to install, service, repair and replace because of the size and weight of the components of the devices. A reduced footprint and improved serviceability are desirable in the design and manufacture of such electric devices. The method, systems and apparatus described herein facilitate reduced device footprint and improved serviceability for an electric device. Designs and methods are provided herein to facilitate reduced device footprint and improved serviceability for an electric device. Designs and methods are further provided herein to facilitate reduced device footprint, improve serviceability for an electric device, lower costs, and improved performance in capacity and efficiency.

Technical effects of the methods, systems, and apparatus described herein include at least one of reduced device footprint, improved serviceability, improved performance and quality and reduced labor costs.

Figure 1:
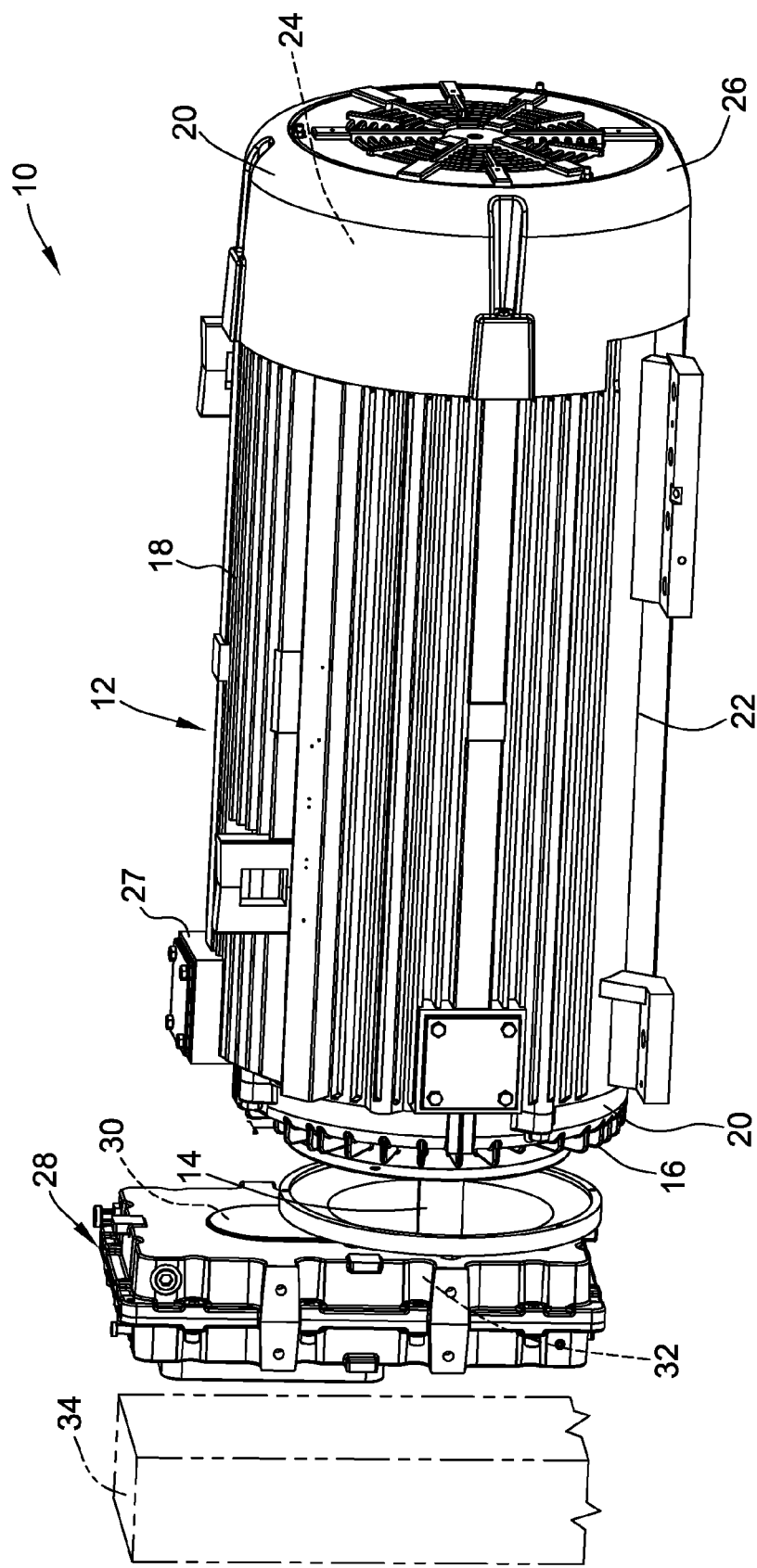
FIG. 1 is a perspective view of an embodiment of the present invention in the form of an electric, device.

According to an embodiment of the present invention and referring to FIG. 1, an electric device 10 is provided. The electrical device may be any suitable electric device and may be, for example, in the form of a pump drive. It should be appreciated that the device may be used to power any other mechanism, for example, a cyclic drive, a compressor, a vehicle, a fan or a blower, but hereinafter will be described as a pump drive. The pump drive 10 includes an electric machine 12. The electric machine 12 may be an electric motor or an electric generator, but hereinafter will be described as an electric motor 12.

The electric motor 12 typically includes a centrally located motor shaft 14 that rotates relative to the motor 12. Electrical energy applied to coils (not shown) within the motor 12. The coils initiate relative motion between the shaft 14 and the motor 12 that transfers the power from the coils to the shaft 14.

A stationary assembly (not shown), also referred to as a stator, includes the stator core and coils or windings positioned around portions of the stator core. It is these coils to which energy is applied to initiate this relative motion which transfers the power to the shaft. These coils are formed by winding wire (not shown), typically copper, aluminum or a combination thereof, about a central core to form the winding or coil. An electric current is directed through the coils which induces a magnetic field. It is the magnetic field that initiates this relative motion which transfers the power to the shaft.

Typically the motor 12 includes a frame 18 and opposed end caps 20. The shaft 14 extends outwardly from an end 16 of the electric motor 12, typically from one of the end caps 20. The motor 12 may have any suitable size and shape and may be, for example, an induction motor, a permanent-split capacitor (PSC) motor, an electronically commutated motor (ECM) motor, or a switched reluctance motor. The frame 18 may include protrusions, for example fins 22, for dissipation of heat. The motor 12 may also include a fan 24 positioned within fan housing 26 which may be integral with end cap 20. The fan 24 may be oriented toward the fins 22 to further assist in cooling the motor 12. The motor 12 also includes a conduit box 27 (see FIG. 2) for connecting a power source (not shown) to the motor 12.

The motor 12 may be a motor of any suitable size and power rating. This invention is particularly well suited for large industrial motors such as motors with power ratings of over 1 horsepower, over 10 horsepower, over 100 horsepower, over 1000 horsepower or larger. For example, the motors may be in the range of 200 to 1000 horsepower. Such large motors may drive large devices, such a large pumps. One such large pump application is for pumping fluids for oil and gas extraction. Such pump applications include, but are not limited to, derricks, particularly off shore platforms. Space in such off shore platforms is very expensive, making a small decrease in pump drive space or footprint very attractive. Installations and repairs in such off shore platforms is also very expensive making easy, simple disassembly, repair and assembly very attractive.

The pump drive 10 also includes a power transfer device in the form of, for example, a gearbox 28. The power transfer device 28 may be any device that provides for an increase or decrease in device speed and/or for a change in the rotational axis of the device. The power transfer device could be, for example, a gearbox, a belted box or a chain and sprocket device. The gearbox 28 is, as shown, operably connected to the electric motor 12.

Figure 2:
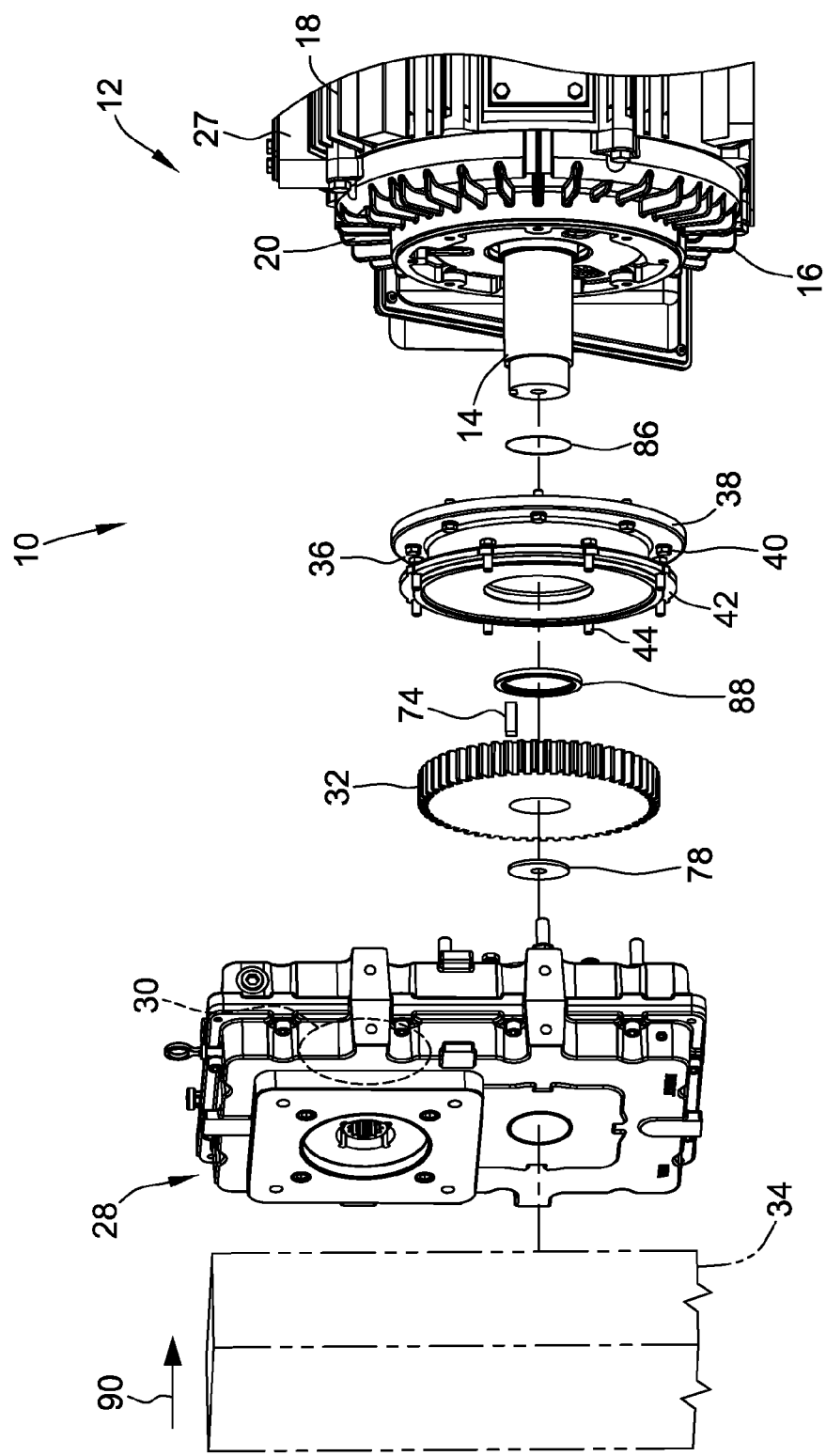
FIG. 2 is a exploded perspective view of the electric device of FIG. 1.

Referring now to FIG. 2, the gearbox 28 includes an output gear or gearbox gear 30 rotatably supported in the gearbox 28 and an input gear or motor gear 32 connectable to the shaft 14 of motor 12. The gearbox gear 30 is adapted to mesh with the motor gear 32. As shown in FIG. 2, the motor 12 and the gearbox 28 are adapted to serve as the pump drive 10 and may be used to drive, for example, a pump 34, shown in phantom.

The gearbox 28 may be secured to the motor 12 in any suitable way. For example, to ease the assembly of the gearbox 28 onto the motor 12, an adapter 36 is provided to connect the gearbox 28 to the motor 12. The adaptor 36 serves to provide for the accommodation of a variety of gearboxes with a variety of connecting features to a variety of motors with a variety of connecting features. Further, the adaptors may be provided with varying thickness to provide variations in the location of the output of the gearbox with respect to the end 16 of the motor 12.

The adaptor 36 may have any suitable shape. For example, the adaptor 36 may include an input flange 38 having a shape that cooperates with motor 12. Input fasteners 40, in the form of, for example, cap screws may be used to removably connect the adaptor 36 with the motor 12. For example, the adaptor 36 may further include an output flange 42 having a shape that cooperates with gearbox 28. Output fasteners 44, in the form of, for example, cap screws may be used to removably connect the adaptor 36 with the gearbox 28.

The adaptor 36 may be made of any suitable material and may, for example be made of a polymer, a composite or a metal. If made of a metal, the adaptor 36 may be, for example, formed, stamped, machined or cast.

Figure 3:
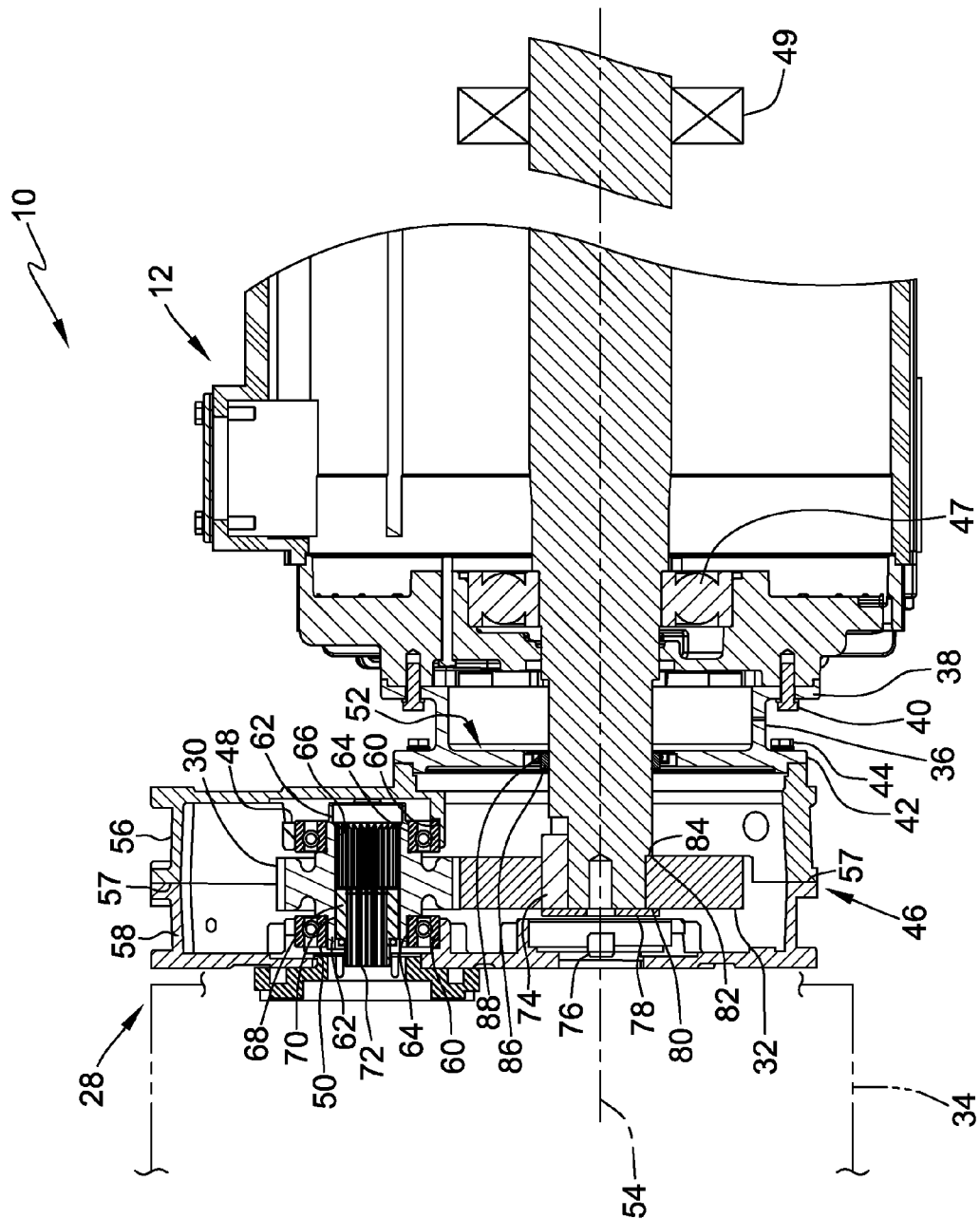
FIG. 3 is a partial cross-sectional plan view of the electric device of FIG. 1 along the line 3-3 in the direction of the arrows.

Referring now to FIG. 3, the pump drive 10 may, as shown, be provided such that the gearbox 28 includes a gearbox housing 46 and such that the gearbox gear 30 is supported by at least one bearing mounted in the gearbox housing 46. For example and as shown in FIG. 3, the gearbox 28 includes an inboard bearing 48 and an outboard bearing 50, with the gearbox gear 30 supported between these bearings 48 and 50.

In an aspect of this invention, to ease assembly, to reduce components and to provide for a more compact design, the input gear 32 is positioned on motor shaft 14 of motor 12 at a location outboard of gearbox side bearing 47 and fan side bearing 49. The input gear 32 is thus cantilevered on motor shaft 14 of motor 12. The cantilevering of the gear 32 obviates the need for any bearings adjacent the gear 32, permitting the gearbox 28 to be narrower and reducing the number of components of the gearbox 28 by two bearings. The cantilevering of the gear 32 also permits the gear to be preassembled onto the motor shaft 14 of motor 12, prior to the gearbox 28 being assembled onto the motor 12.

As shown in FIG. 3, the gearbox 28 includes an input gear opening 52 formed in gearbox housing 46. The input gear opening 52 in gearbox housing 46 permits the gearbox housing 46 to be advanced along rotational centerline 54 of motor shaft 14 toward the motor 12 to easily assemble the gearbox 28 to the motor 12 to form the pump drive 10.

To assist in the manufacture, assembly and maintenance of the gearbox 28 and as shown in FIG. 3, the gearbox housing 46 is preferably made from an inner gearbox housing portion 56 and an outer gearbox housing portion 58. The input gear opening 52 is formed in the inner gearbox housing portion 56. As shown in 3, the gearbox housing portions 56 and 58 may, for simplicity, be connectable by planar surfaces 57, one on each portion. For simplicity, the surfaces 57 may be normal or perpendicular to the rotational centerline 54 of motor shaft 14. The output flange 42 of the adaptor 36 connects to the inner gearbox housing portion 56 to cover the input gear opening 52 and provides a sealed enclosure for the gearbox 28.

Bearing seats 60 are formed in the portions 56 and 58 of the housing 46 to receive the bearings 48 and 50, respectively. The output gear 30, as shown, includes opposed integral hubs 62 onto which bores 64 of the bearings 48 and 50 are fitted. It should be appreciated that the output gear may alternatively include a bore to which may be fitted a shaft for cooperation with the bearings.

As shown, the output gear 30 may include a bore 66 with an internal spline for mating with an input shaft of pump 34. Alternatively, and as shown in FIG. 3, the gearbox 28 may further include a pump shaft adaptor 68 which includes an external spline 70 for engagement with internal spline of bore 66 of output gear 30 and an internal spline 72 for engagement with the input shaft of pump 34. Such a configuration permits the use of a common gearbox 28 with pumps with different input shafts.

The input gear 32 may be secured to the motor shaft 12 in any suitable manner. For example the gear 32 may be fitted to the shaft 12 by an interference fit, by a tapered fit by a splined connection or by a mating flat and protrusion or by a keyed connection. As shown in FIG. 3, the input gear 32 may be secured to the shaft 12 by a key 74 fitted to shaft 12 and gear 32, as well as by a cap screw 76 threadably engaging shaft 12. The cap screw 76 draws a keeper plate 78 against an outboard face 80 of the gear 32 and a stepped face 82 of shaft 14 against an inboard face 84 of the gear 32.

While the motor shaft 32 may be sealed from the gearbox 28 in any suitable manner, as shown in FIG. 3, the motor shaft 14 may include a seal ring 86 fitted to shaft 14. The sealing ring mates with seal 88 that is supported by adaptor 36. The ring 86 and the seal 88 may be easily replaced if worn or damaged.

Referring again to FIG. 2, a method of assembling the gearbox 28 onto the motor 12 is shown in greater detail. First, the seal ring 86 is fitted to shaft 14 of motor 12. The ring 86 may, for example, be interference fitted, by, for example, a shrink fit, to shaft 14. A sealant (not shown) may be used to prevent the leakage of lubricant at the shaft/ring interface. The seal 88 is next installed into adaptor 36. The key 74 is then installed into motor shaft 14. The input gear 32 is then mounted precisely, but removably, onto motor shaft 14 and key 74. The gearbox 28 is then advanced in the direction of arrow 90. The input gear 32 is meshed with output gear 30. Finally, the inner gearbox housing portion 56 is secured to the adaptor 36 with output fasteners 44.

The gearbox 28 may provide a change in axial position of the output of the pump drive 10 and/or a change in rotational speed of the pump drive 10. As shown in FIGS. 1-3, the gearbox 28 provides for a speed increase for the pump drive. It should be appreciated; however, that by providing an output gear that is larger than the input gear, the gearbox may provide a speed decrease and a torque increase.

While the present invention may be practiced with a solitary output shaft, it should be appreciated that the invention may be in form of a pump drive that provides for multiple output shafts, permitting the pump drive to drive a plurality of devices.

For example and referring now to FIGS. 4-7, another embodiment of the present invention is shown as electric device or pump drive 110. The pump drive 110 includes a motor 112 operably connected to a gearbox 128.

The motor 112 is similar to motor 12 of FIGS. 1-3 and includes a freeze plug 115 positioned at a location similar to that of shaft 14 of motor 12.

Figure 5:
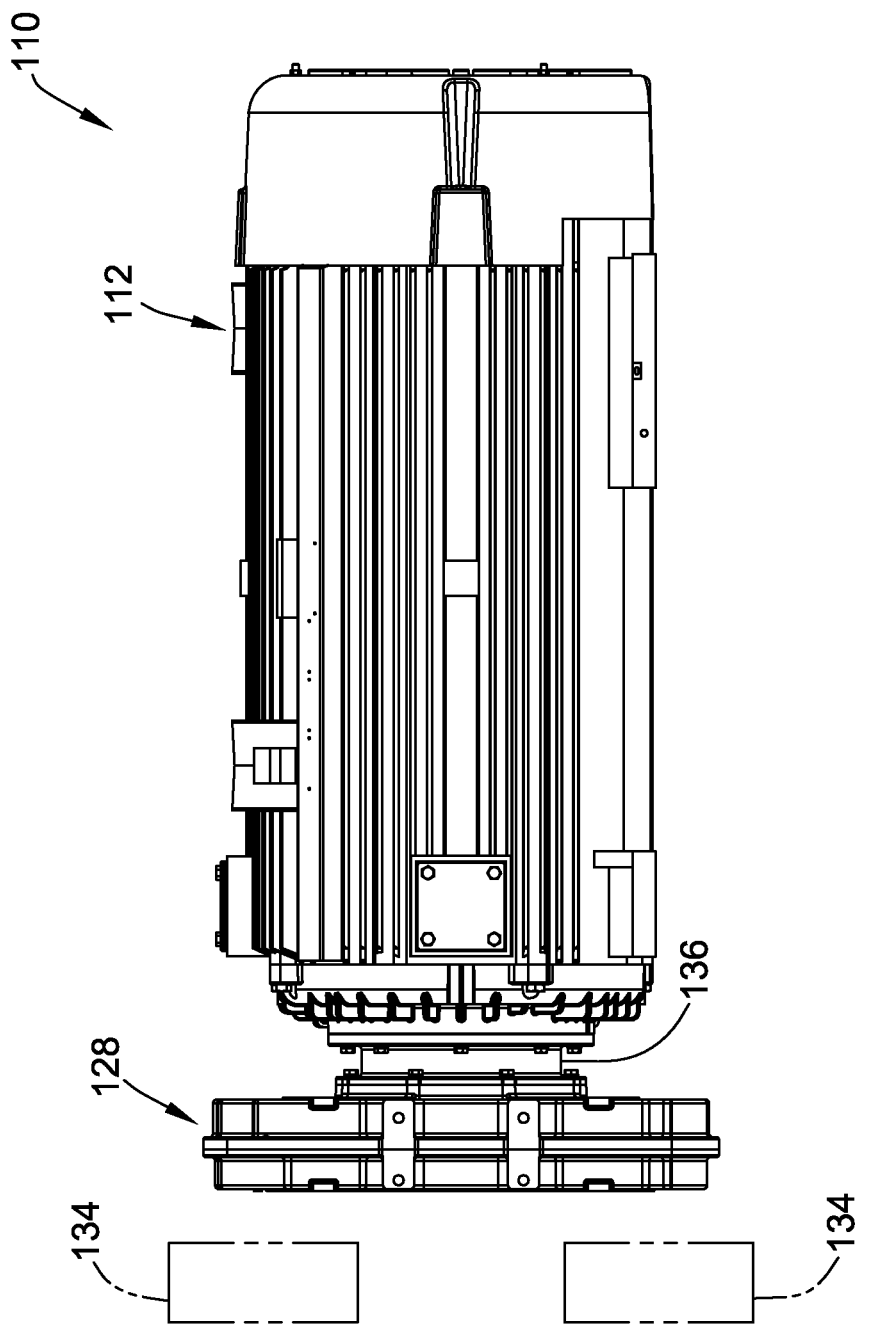
FIG. 5 is a plan view of the electric device of FIG. 4.
Figure 6:
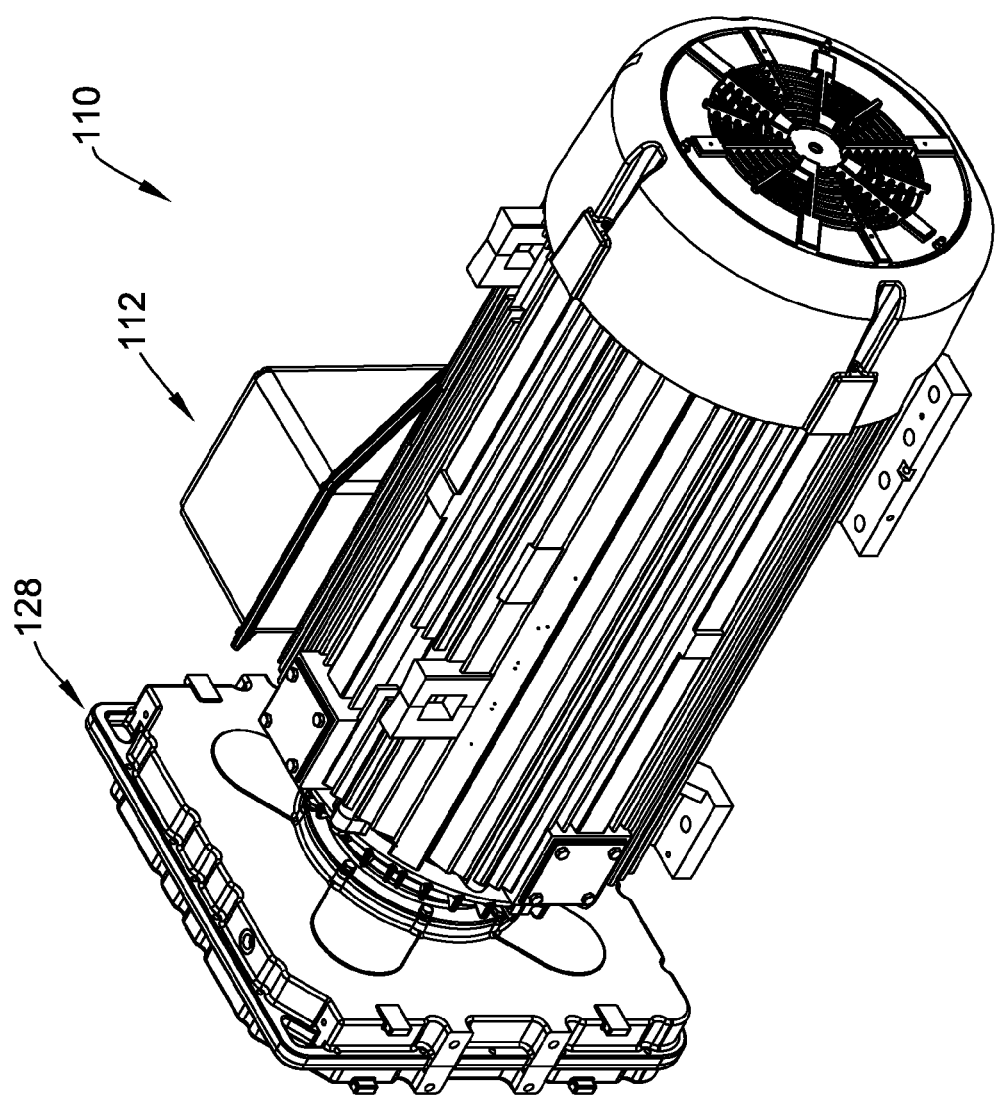
FIG. 6 is another perspective view of the electric device of FIG. 4 showing the device in another orientation.

Referring now to FIG. 5, the drive 110, similar to device 10 of FIGS. 1-3, includes an adaptor 136, similar to adaptor 36 of device 10, for connecting the motor 112 to gearbox housing 146 of gearbox 128.

Figure 4:
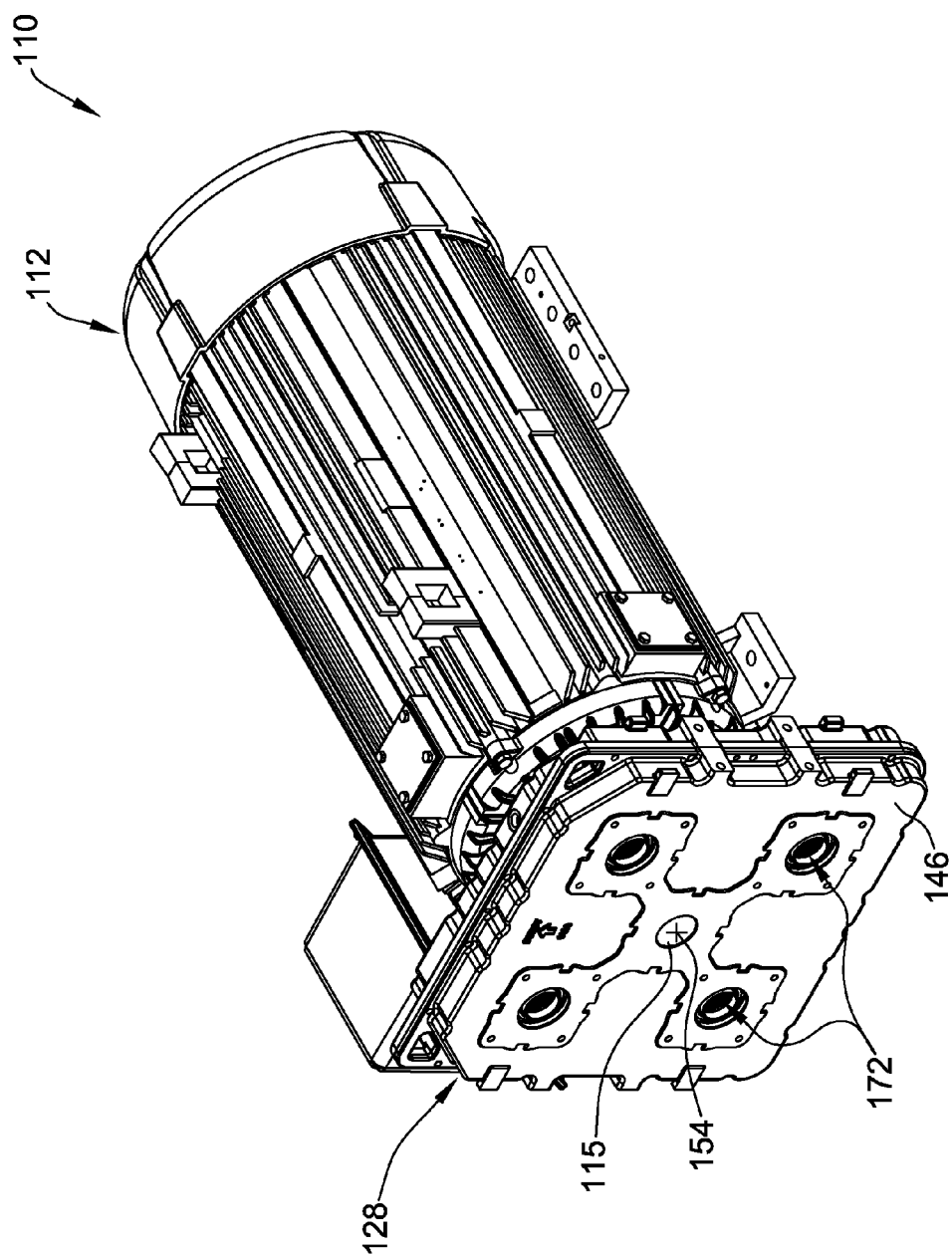
FIG. 4 is a perspective view of another embodiment of an electric device in accordance with the present invention in the form of an electric device with multiple outputs.

The gearbox 128 of drive 110 is different from the gearbox 28 of drive 10 of FIGS. 1-3 in that gearbox 128, as shown in FIG. 4, includes a plurality of output connections 172, each of the output connections 172 capable of driving a separate device, for example, a separate pump 134 (see FIG. 5).

As shown in FIG. 4, the output connections 172 are spaced from rotational centerline 154 of motor 112. For simplicity the output connections 172 may be spaced equally form the rotational centerline 154 of motor 112. While, as shown in FIG. 4, the drive 110 includes four separately equally space output connections 172, it should be appreciated that any number of output connections from two to four, or more, may be provided.

Figure 7:
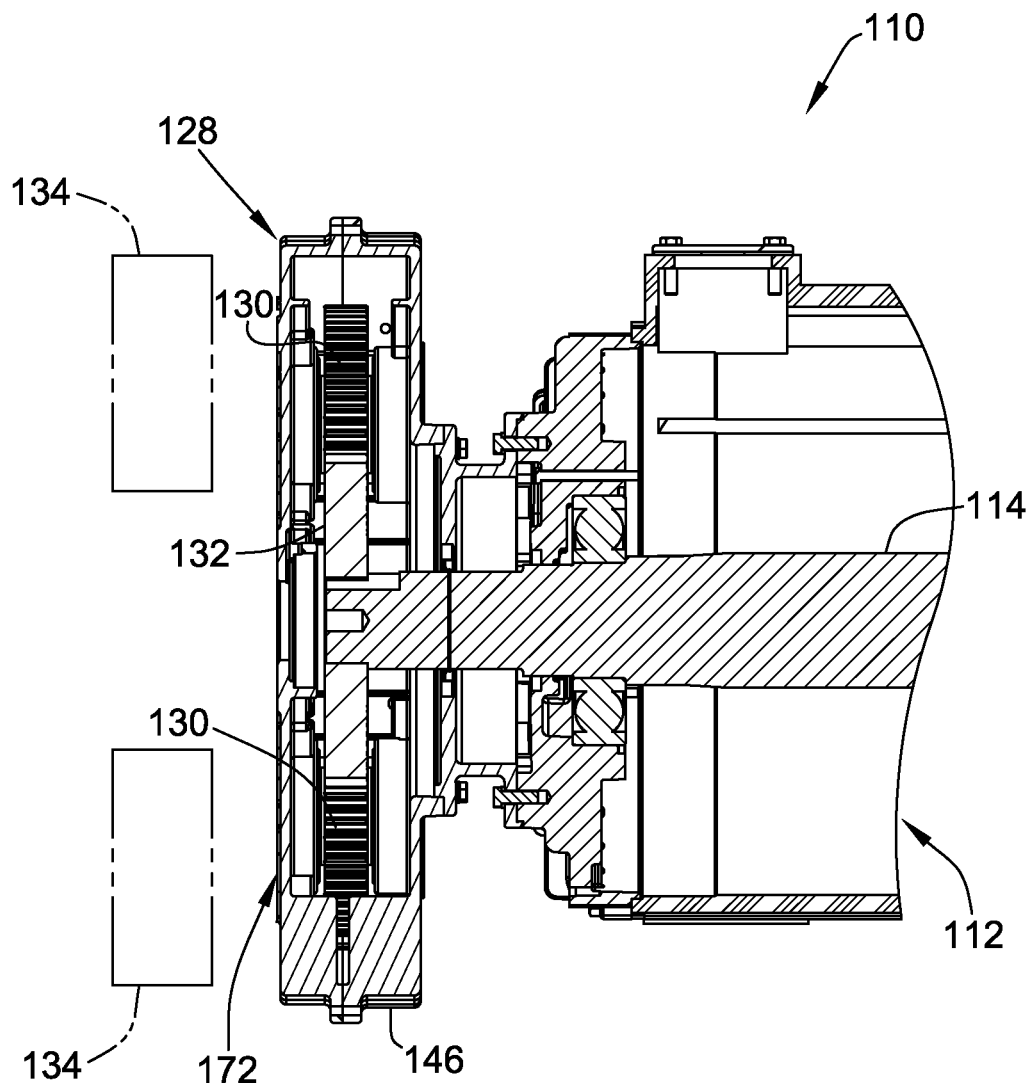
FIG. 7 is a partial plan view of the electric device of FIG. 4, showing a portion of the device in a cut away fashion.

Referring now to FIG. 7, the drive 110 is shown in greater detail. As shown, an input gear 132 is mounted onto motor shaft 114. The input gear 132 meshes with a plurality of output gears 130 rotatably supported by gearbox housing 146. As shown and for simplicity the output gears 130 are identical to each other, but may be different. The output gears are operably connected to output connections 172 that may be in the form of internal splines for connection with an externally splined shafts (not shown) on pumps 134.

Figure 8:
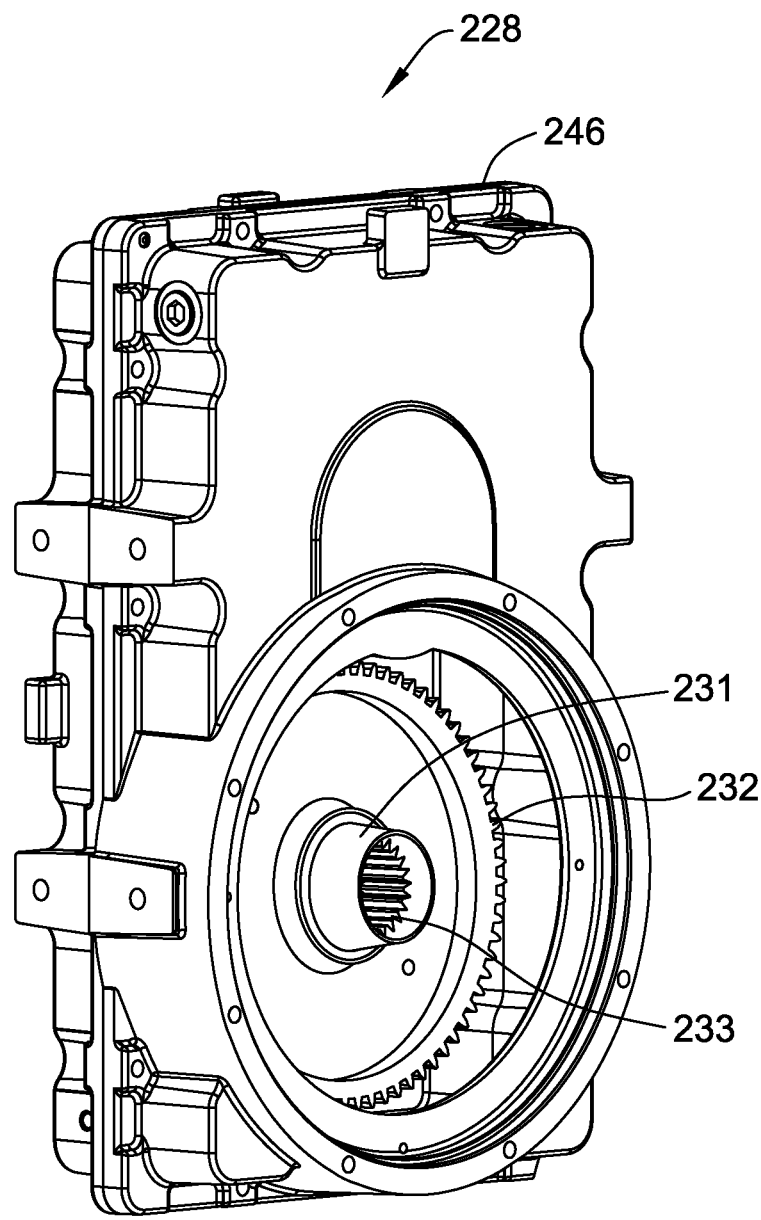
FIG. 8 is a perspective view of another embodiment of an electric device in accordance with the present invention in the form of an electric device with an input gear with a hub.
Figure 9:
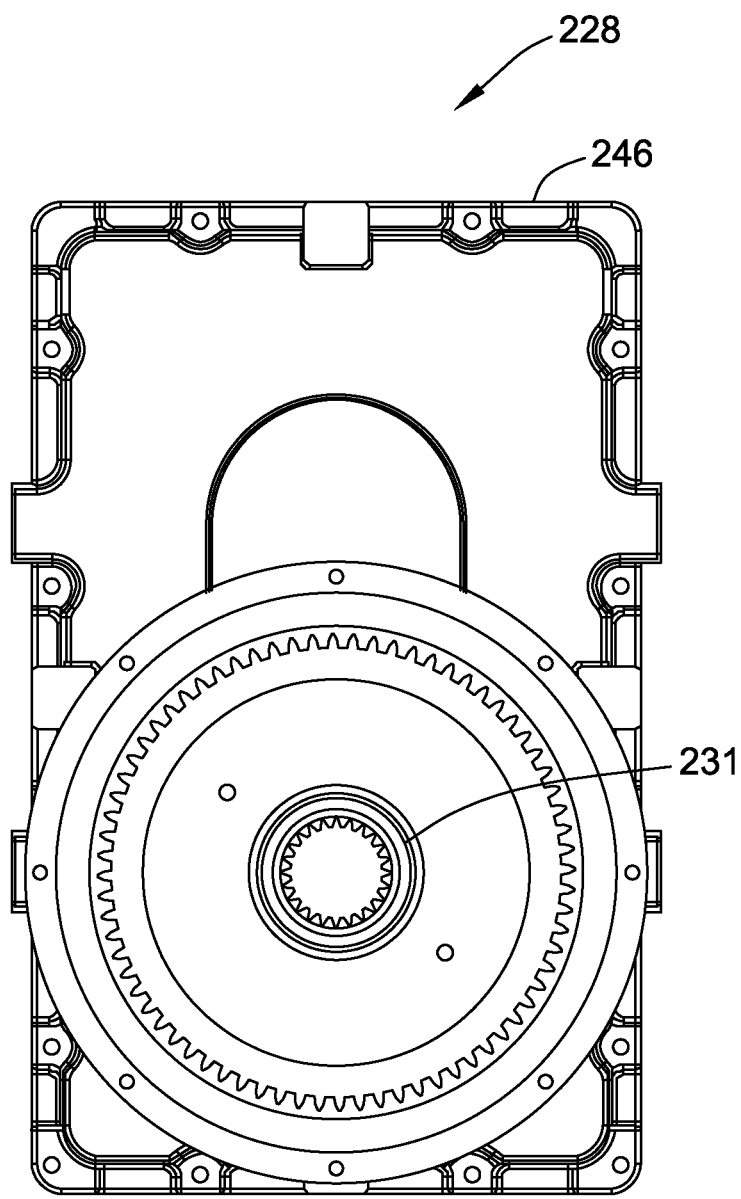
FIG. 9 is a plan view of the electric device of FIG. 8.

Referring now to FIGS. 8 and 9, another embodiment of the present invention is shown as gearbox 228. Gearbox 228 may be connected to a motor similar to motor 12 of FIGS. 1-3 to form a pump drive similar to pump drive 10 of FIGS. 1-3.

The gearbox 228 is similar to gearbox 28 of FIGS. 1-3 and includes a gearbox housing 246 similar to gearbox housing 46 of FIGS. 1-3. The gearbox 228 includes a motor gear or input gear 232 that is different from input gear 32 of the gearbox 28 of the drive 10 of FIGS. 1-3. The input gear 232 includes a central hub 231 and an internal spline 233 that mates with an external spline (not shown) on motor shaft (not shown). The hub 231 and the spline 233 provide for increased torque transfer capability for the input gear 232.

Figure 10:
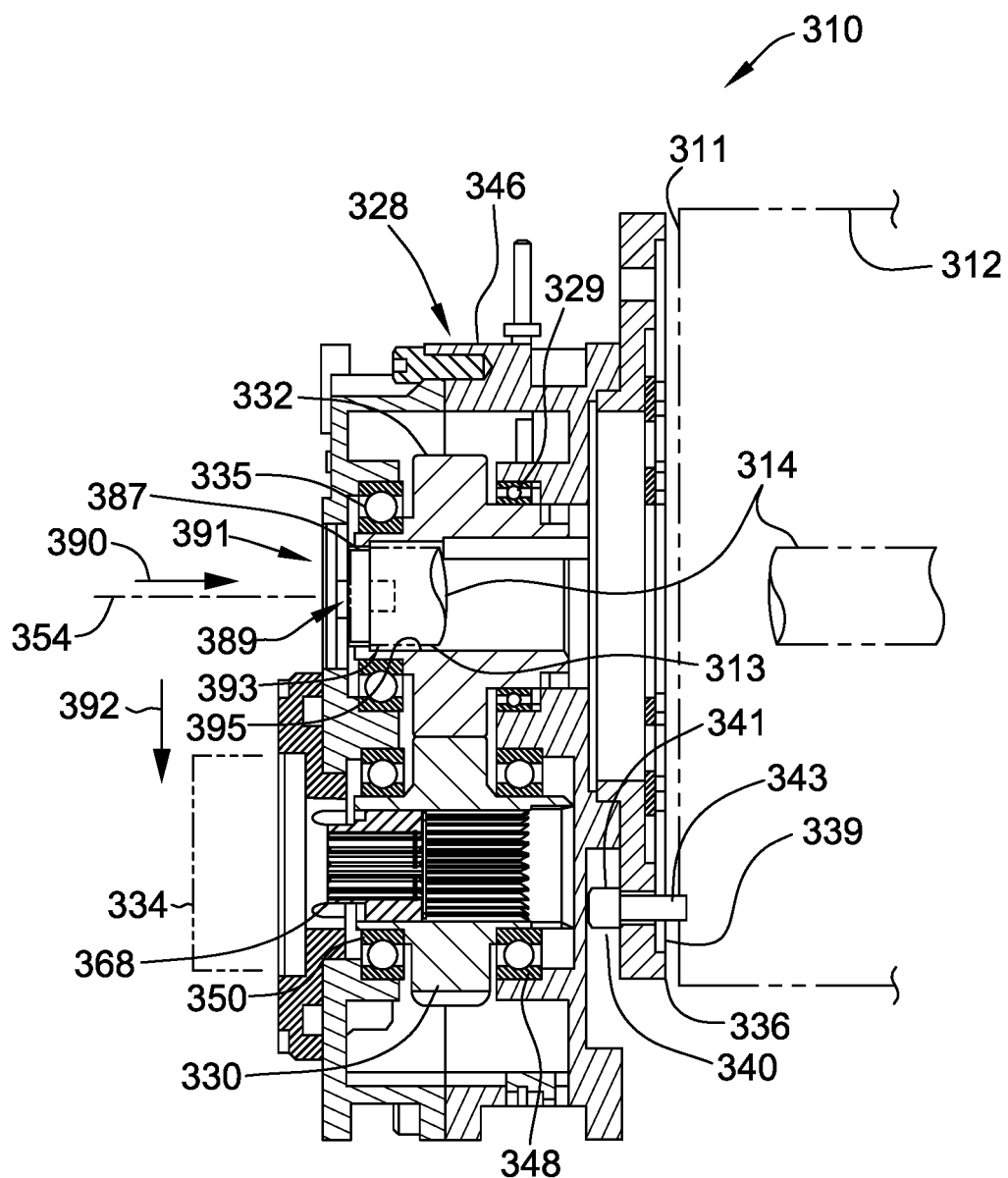
FIG. 10 is a partial cross-sectional plan view of another embodiment of an electric device in accordance with the present invention.
Figure 11:
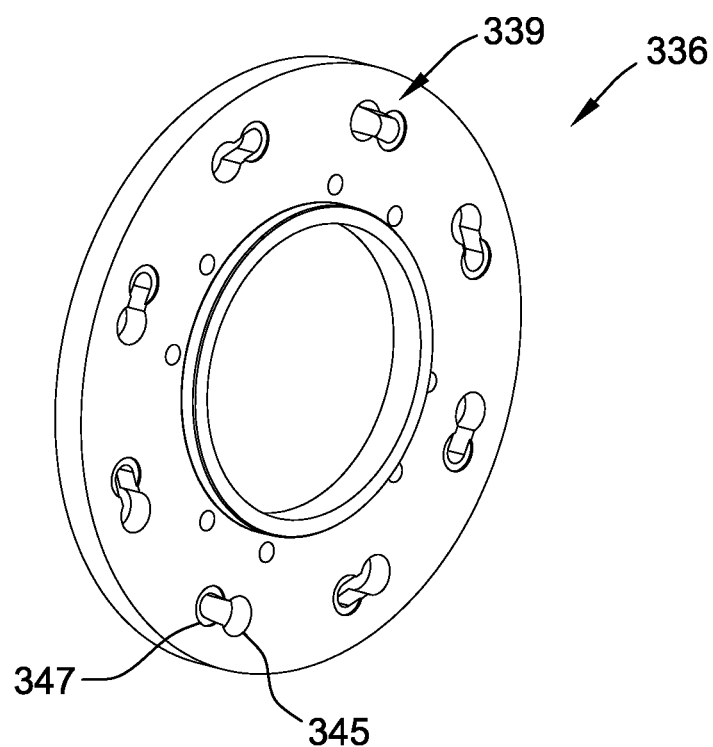
FIG. 11 is a perspective view of the adaptor of the electric device of FIG. 6.
Figure 12:
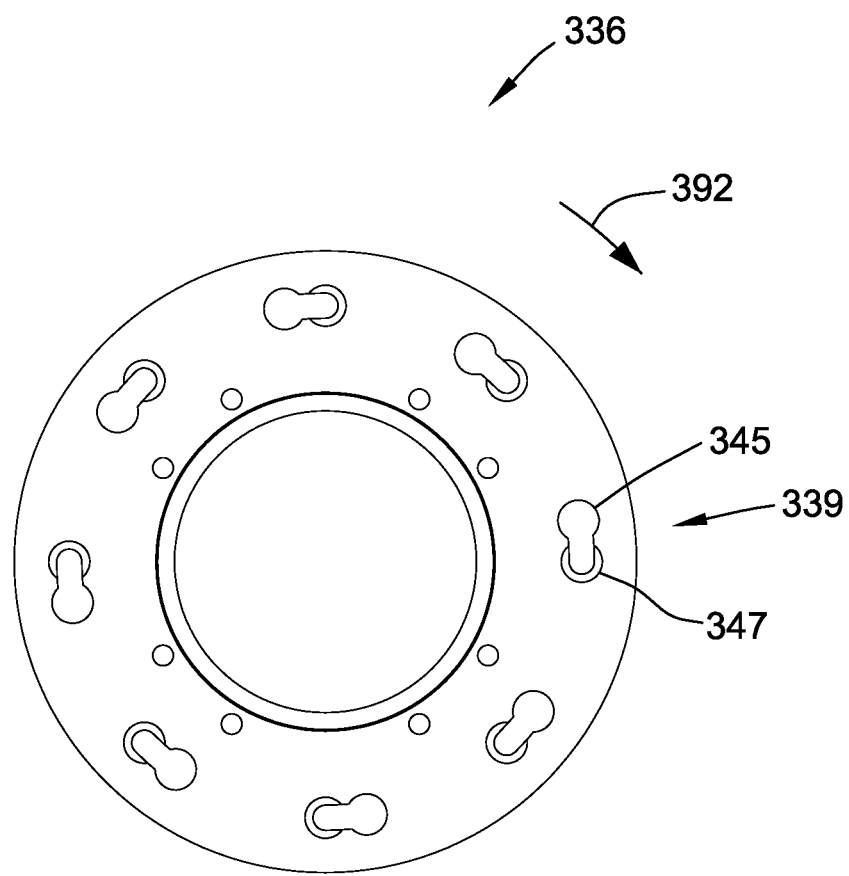
FIG. 12 is a plan view of the adaptor of FIG. 11.
Figure 13:
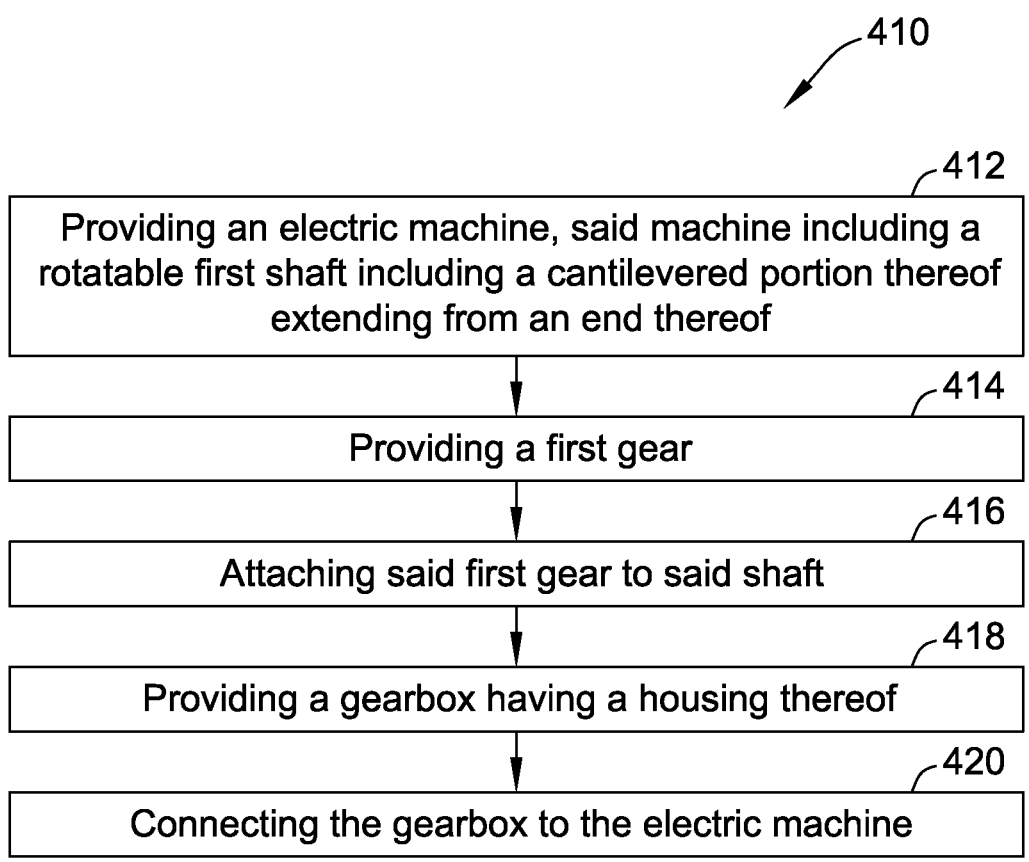
FIG. 13 is a flow chart of another embodiment of the present invention in the form of a method for providing an electric device.

Referring now to FIGS. 10-12, another embodiment of the present invention is shown as electric device or pump drive 310. Pump drive 310 includes an electric machine or motor 312 similar to motor 12 of the drive 10 of FIGS. 1-3. The pump drive 310 also includes a gearbox 328 similar to the gearbox 28 of FIGS. 1-3, but having a different arrangement for supporting input gear or motor gear 332, also known as second gear 332.

Similar to motor gear 32 of drive 10 of FIGS. 1-3, the motor gear 332 is driven by motor shaft or first shaft 314 of motor 312. However the motor gear 332 is supported differently than gear 32 of drive 10 of FIGS. 1-3. Motor gear 332 is supported in gearbox housing 346 by motor gear inboard support bearing 329 and motor gear outboard support bearing 335. A cantilevered portion 313 of the motor shaft 314 extends from end 311 of motor 312. The motor shaft 314 is in clearance with the motor gear 332 so that the shaft 314 may be supported by bearings 329 and 335 while a torque transmitting feature 391 in the form of, for example, a spline, flat or may be used to provide for the transmission of torque from the motor 312 to the motor gear 332. An end cap 387 may be engagable with an opening 389 in shaft 314 for securing the motor gear 332 onto the motor shaft 314. The motor shaft 314 may include an external spline 393 that mates with an internal spline 395 formed in the motor gear 332. The motor gear 332 meshes with gearbox gear or first gear 330 which is supported by bearings 350 and 348. A pump shaft adapter 368 is connected to the gearbox gear 330 and is used to drive pump 334.

The gearbox housing 346 may be connected to motor 312 by an adaptor 336. The adaptor 336, as shown in FIG. 12, may include a pattern of elongated openings 339 with larger portions 345 for passage of fastener heads 341 of input fasteners 340 and smaller portions 347 for passage of fastener shanks 343 of input fasteners 340 only. The openings 339 mate with the input fasteners 340 secured to motor 312. The gearbox 328 may be mounted onto the motor 312 by advancing the gearbox 328 toward the motor 312 in the direction of arrow 390 along axis of rotation 354 of motor shaft 314 passing the heads 341 of input fasteners 340 through larger portions 345 of elongated openings 339. The gearbox 328 and adaptor 336 are then rotated relative to the motor 312 in the direction of arrows 392 to secure the gearbox 328 to the motor 312 in a bayonet locking arrangement.

According to another embodiment of the present invention a method 410 for making an electric device is provided. The method includes step 412 of providing an electric machine. The electric machine includes a rotatable first shaft including a cantilevered portion thereof extending from an end of the first shaft. The method also includes step 414 of providing a first gear, step 416 of attaching the first gear to the shaft and step 418 of providing a gearbox having a housing. The method also includes step of 420 of connecting the gearbox to the electric machine.

It should be appreciated that the method may be provided such that the step of connecting the gearbox to the electric machine includes advancing the motor toward the gearbox housing in a direction parallel to the longitudinal axis of the first shaft.

The methods, systems, and apparatus described herein facilitate efficient and economical assembly of an electric machine. Exemplary embodiments of methods, systems, and apparatus are described and/or illustrated herein in detail. The methods, systems, and apparatus are not limited to the specific embodiments described herein, but rather, components of each apparatus and system, as well as steps of each method, may be utilized independently and separately from other components and steps described herein. Each component, and each method step, can also be used in combination with other components and/or method steps.

When introducing elements/components/etc. of the methods and apparatus described and/or illustrated herein, the articles "a", "an", "the", and "the" are intended to mean that there are one or more of the element(s)/component(s)/etc. The terms "comprising", "including", and "having" are intended to be inclusive and mean that there may be additional element(s)/component(s)/etc. other than the listed element(s)/component(s)/etc.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Described herein are exemplary methods, systems and apparatus utilizing lower cost materials in a permanent magnet machine that reduces or eliminates the efficiency loss caused by the lower cost material. Furthermore, the exemplary methods system and apparatus achieve increased efficiency while reducing or eliminating an increase of the length of the machine. The methods, system and apparatus described herein may be used in any suitable application. However, they are particularly suited for HVAC and pump applications.

Exemplary embodiments of the fluid flow device and system are described above in detail. The electric machine and its components are not limited to the specific embodiments described herein, but rather, components of the systems may be utilized independently and separately from other components described herein. For example, the components may also be used in combination with other machine systems, methods, and apparatuses, and are not limited to practice with only the systems and apparatus as described herein. Rather, the exemplary embodiments can be implemented and utilized in connection with many other applications.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An electric device, comprising:
   an electric machine, said electric machine including a rotatable first shaft extending from an end thereof;
   a gearbox operably connected to said electric machine, said gearbox including a first gear rotatably supported in said gearbox, said gearbox including a gearbox housing; and
   a second gear mounted directly on said first shaft, said second gear adapted to mesh with said first gear, said electric machine and said gearbox adapted to drive a pump, said first gear defining a first gear rotational centerline, said gearbox housing defining a second gear rotational centerline about which said second gear rotates when in position in said gearbox housing and in mesh with said first gear, said gearbox housing defining an external opening thereof, said second gear being assembled into said gearbox by advancing said second gear along the second gear rotational centerline from a first position outside said gearbox to a second position in mesh with said first gear.

2. The device as in claim 1,
   wherein said second gear is supported by at least one bearing mounted in said gearbox housing.

3. The device as in claim 1, further comprising an adapter for connecting said electric machine to said gearbox.

4. The device as in claim 3, wherein said adapter is configured to permit engagement of said machine with said gearbox in a direction parallel with the axis of rotation of said first shaft.

5. The device as in claim 1:
   wherein said gearbox includes a gearbox housing, defining an interior and an exterior thereof; and
   wherein said gearbox housing defines an opening thereof, said opening permitting the passage of said first gear from the exterior of the housing to the interior of the housing, while the first gear is connected to said first shaft.

6. The device as in claim 1:
   wherein said first shaft defines a central longitudinal opening therein; and
   further comprising an end cap engagable with the opening for securing said second gear onto said first shaft.

7. The device as in claim 1, wherein said first shaft is only rotatably supported by said machine.

8. The device as in claim 1;
   further comprising a collar rigidly supported on said first shaft; and
   further comprising a seal in sealing engagement with said collar.

9. An electric device, comprising:
   an electric machine, said electric machine including a rotatable first shaft including a cantilevered portion thereof extending from an end thereof;
   a gearbox operably connected to said electric machine, said gearbox including a first gear rotatably supported in said gearbox, said gearbox including a gearbox housing; and
   a second gear mounted directly on the cantilevered portion of said first shaft, said second gear adapted to mesh with said first gear, said first gear defining a first gear rotational centerline, said gearbox housing defining a second gear rotational centerline about which said second gear rotates when in position in said gearbox housing and in mesh with said first gear, said gearbox housing defining an external opening thereof, said second gear being assembled into said gearbox by advancing said second gear along the second gear rotational centerline from a first position outside said gearbox to a second position in mesh with said first gear.

10. The device as in claim 9,
    wherein said second gear is supported by at least one bearing mounted in said gearbox housing.

11. The device as in claim 9, further comprising an adapter for connecting said electric machine to said gearbox.

12. The device as in claim 11, wherein said adapter is configured to permit engagement of said machine with said gearbox in a direction parallel with the axis of rotation of said first shaft.

13. The device as in claim 9:
- wherein said gearbox includes a gearbox housing, defining an interior and an exterior thereof; and
- wherein said gearbox housing defines an opening thereof, said opening permitting the passage of said second gear from the exterior of the housing to the interior of the housing, while the second gear is connected to said first shaft.

14. The device as in claim 9:
- wherein said first shaft defines a central longitudinal opening therein; and
- further comprising an end cap engagable with the opening for securing said second gear onto said first shaft.

15. The device as in claim 9;
- further comprising a collar rigidly supported on said first shaft; and
- further comprising a seal in sealing engagement with said collar.

16. The device as in claim 9, wherein said gearbox includes a first gearbox housing portion and a second gearbox housing portion connected to said first gearbox housing portion, said first gearbox housing portion and said second gearbox housing portion connected to each other along a plane normal to the longitudinal axis of said first shaft.

* * * * *